(12) United States Patent
Pandey et al.

(10) Patent No.: US 9,494,086 B2
(45) Date of Patent: Nov. 15, 2016

(54) SYSTEMS AND METHODS FOR IMPROVED COMBINED CYCLE CONTROL

(71) Applicant: General Electric Company, Schenectady, NY (US)

(72) Inventors: Achalesh Kumar Pandey, San Ramon, CA (US); John Edward Sholes, Kings Mountain, NC (US); Dwayne David McDuffie, Schenectady, NY (US); Kamlesh Mundra, Clifton Park, NY (US);
(Continued)

(73) Assignee: General Electric Company, Schenectady, NY (US)

( * ) Notice: Subject to any disclaimer, the term of this patent is extended or adjusted under 35 U.S.C. 154(b) by 442 days.

(21) Appl. No.: 14/194,228

(22) Filed: Feb. 28, 2014

(65) Prior Publication Data
US 2015/0247464 A1 Sep. 3, 2015

(51) Int. Cl.
*G06F 7/00* (2006.01)
*F02C 9/56* (2006.01)
(Continued)

(52) U.S. Cl.
CPC . *F02C 9/56* (2013.01); *F01K 5/02* (2013.01); *F02C 6/18* (2013.01); *F02C 9/00* (2013.01); *F02G 5/00* (2013.01); *G05B 15/02* (2013.01); *G05B 17/02* (2013.01); *F05D 2260/81* (2013.01); *F05D 2260/821* (2013.01);
(Continued)

(58) Field of Classification Search
CPC ....................................................... F02C 9/56
See application file for complete search history.

(56) References Cited

U.S. PATENT DOCUMENTS

| 4,184,324 A | 1/1980 | Kiscaden et al. |
| 4,578,944 A | 4/1986 | Martens et al. |

(Continued)

FOREIGN PATENT DOCUMENTS

| EP | 1538319 A1 | 6/2005 |
| EP | 1950636 A1 | 7/2008 |

(Continued)

OTHER PUBLICATIONS

European Search Report and Written Opinion issued in connection with corresponding EP Application No. 15156631.2-1607 dated Jul. 27, 2015.

*Primary Examiner* — Philip Wang
(74) *Attorney, Agent, or Firm* — Fletcher Yoder, P.C.

(57) ABSTRACT

Systems and methods for improved control of a turbomachine system with a bottoming cycle system are presented. The systems and methods include a controller that utilizes modeling techniques to derive a plurality of load path curves. The controller utilizes a current load path, a minimum load path, and a constant efficiency load path. The systems and methods include a control process configured to receive a user input representative of a life cycle control modality and to execute a control action based on deriving a load efficiency by applying the current load path, the minimum load path, the constant efficiency load path, or a combination thereof, and the life cycle control modality. The control action is applied to control the turbomachine system and the bottoming cycle system fluidly coupled to the turbomachine system. Further, the life cycle control modalities may be selected by a user based upon known tradeoffs.

20 Claims, 4 Drawing Sheets

(72) Inventors: Maria Cecilia Mazzaro, Greenville, SC (US)

(51) Int. Cl.
| | |
|---|---|
| *F02C 6/18* | (2006.01) |
| *F02C 9/00* | (2006.01) |
| *F02G 5/00* | (2006.01) |
| *G05B 15/02* | (2006.01) |
| *G05B 17/02* | (2006.01) |
| *F01K 5/02* | (2006.01) |

(52) U.S. Cl.
CPC ... *F05D 2270/083* (2013.01); *F05D 2270/112* (2013.01); *F05D 2270/20* (2013.01); *F05D 2270/3032* (2013.01); *F05D 2270/332* (2013.01); *F05D 2270/71* (2013.01); *Y02E 20/16* (2013.01)

(56) References Cited

U.S. PATENT DOCUMENTS

| | | | |
|---|---|---|---|
| 5,551,227 A | 9/1996 | Moulton et al. | |
| RE36,497 E * | 1/2000 | Tomlinson | F01K 23/106 60/39.182 |
| 6,173,563 B1 * | 1/2001 | Vakil | F01K 23/106 60/39.182 |
| 6,226,974 B1 | 5/2001 | Andrew et al. | |
| 6,474,069 B1 * | 11/2002 | Smith | F01K 23/106 60/39.182 |
| 6,539,783 B1 | 4/2003 | Adibhatla | |
| 6,823,253 B2 | 11/2004 | Brunell | |
| 6,823,675 B2 | 11/2004 | Brunell et al. | |
| 7,131,259 B2 | 11/2006 | Rollins, III | |
| 7,219,040 B2 | 5/2007 | Renou et al. | |
| 7,269,953 B2 | 9/2007 | Gadde et al. | |
| 7,363,094 B2 | 4/2008 | Kumar | |
| 7,824,636 B1 | 11/2010 | Kraemer et al. | |
| 7,914,747 B1 | 3/2011 | Kraemer | |
| 2005/0193739 A1 * | 9/2005 | Brunell | G05B 13/048 60/772 |
| 2008/0178600 A1 | 7/2008 | Healy et al. | |
| 2008/0243352 A1 * | 10/2008 | Healy | F01D 17/00 701/100 |
| 2008/0288120 A1 | 11/2008 | Lindenmuth et al. | |
| 2008/0288928 A1 | 11/2008 | Bowers et al. | |
| 2009/0005951 A1 | 1/2009 | Frederick et al. | |
| 2009/0005952 A1 | 1/2009 | Tonno et al. | |
| 2009/0043447 A1 | 2/2009 | Vershinin et al. | |
| 2009/0056342 A1 | 3/2009 | Kirzhner | |
| 2009/0097968 A1 | 4/2009 | Ballard, Jr. et al. | |
| 2009/0205334 A1 | 8/2009 | Aljabari et al. | |
| 2010/0034635 A1 | 2/2010 | Erickson et al. | |
| 2010/0077970 A1 | 4/2010 | Kumar et al. | |
| 2010/0103424 A1 | 4/2010 | Davis, Jr. et al. | |
| 2010/0107595 A1 * | 5/2010 | Hardwicke | F01K 23/10 60/39.182 |
| 2010/0146857 A1 | 6/2010 | Zamansky et al. | |
| 2010/0215480 A1 | 8/2010 | Leach et al. | |
| 2010/0256888 A1 | 10/2010 | Tong et al. | |
| 2010/0286889 A1 | 11/2010 | Childers | |
| 2011/0037276 A1 | 2/2011 | Hoffmann et al. | |
| 2011/0289932 A1 | 12/2011 | Thompson | |
| 2012/0023953 A1 | 2/2012 | Thomas et al. | |
| 2012/0070266 A1 | 3/2012 | Schaberg et al. | |
| 2012/0072194 A1 | 3/2012 | Arnold et al. | |
| 2012/0078567 A1 | 3/2012 | Ewens et al. | |
| 2012/0096927 A1 | 4/2012 | Freund | |
| 2012/0208153 A1 | 8/2012 | Bolla | |
| 2012/0260667 A1 | 10/2012 | Chillar et al. | |
| 2012/0285174 A1 | 11/2012 | Hannula | |
| 2012/0290250 A1 | 11/2012 | Snider et al. | |
| 2013/0158731 A1 | 6/2013 | Chandler | |
| 2014/0060065 A1 * | 3/2014 | Sweet | F02C 6/18 60/773 |
| 2014/0250885 A1 * | 9/2014 | Kalina | F02C 6/18 60/653 |
| 2014/0260177 A1 * | 9/2014 | Reed | F02C 9/22 60/39.24 |
| 2014/0260284 A1 * | 9/2014 | Kim | F02C 7/057 60/772 |
| 2015/0275703 A1 * | 10/2015 | Thompson | F01K 23/101 60/773 |

FOREIGN PATENT DOCUMENTS

| | | |
|---|---|---|
| EP | 2562372 A2 | 2/2013 |
| EP | 2657468 A2 | 10/2013 |

* cited by examiner

SYSTEMS AND METHODS FOR IMPROVED COMBINED CYCLE CONTROL

BACKGROUND OF THE INVENTION

The subject matter disclosed herein relates to controls for turbomachinery systems, such as gas turbines, and more specifically, to systems and methods for improving controls of gas turbine systems having a bottoming cycle system.

Turbomachine systems may include a variety of components and subsystems participating in a process. For example, a turbomachine may include a load, fuel lines, combustors, turbine system, exhaust systems, and so forth, which generate exhaust gases. The exhaust gases generated from the turbomachine system may be fed into a bottoming cycle, such as a heat recovery steam generator (HRSG). An HRSG may convert the exhaust gas to steam, superheat the steam, and feed the steam to a steam turbine. The temperature of the exhaust gas may have an impact on the life of the turbomachine system and the HRSG, and it is dependent on the firing temperature within the turbomachine system.

In a turbomachine system, the firing temperature is the temperature produced within the turbine's combustion system (e.g., flame temperature). Typical turbomachines generally run at a high firing temperature load path because of combustion system limitations and inflexibility. For example, the higher firing temperature is generally utilized to satisfy emissions, lean blow-out, and combustion dynamics requirements. However, higher firing temperature load paths may cause shorter life of a turbomachine system and its combustion parts, as well as a higher turbine exhaust temperature. In turn, higher turbine exhaust temperature leads to higher steam temperature. In order to maintain the steam temperature within the steam turbine and HRSG design temperature limits, water is oftentimes sprayed into superheater and reheater steam circuits. As a result, the HRSG's pressure parts and steam piping's lives are shortened. Further, combined cycle efficiency is lowered. Thus, there is a need to enhance turbomachine system life while reducing the impact on combined cycle efficiency.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a controller including a memory storing a current load path, a minimum load path, and a constant efficiency load path. The system also includes a processor configured to execute a control process, where the control process is configured to receive a user input representative of a life cycle control modality and to execute a control action based on deriving a load efficiency by applying the current load path, the minimum load path, the constant efficiency load path, or a combination thereof, and the life cycle control modality, where the control action is applied to control a turbomachine system and a bottoming cycle system fluidly coupled to the turbomachine system.

In a second embodiment, a computer-readable medium storing non-transitory computer instructions, the instructions are configured to provide a current load path, provide a minimum load path, and provide a constant efficiency load path. The computer instructions are further configured to receive a user input representative of a life cycle control modality for a turbomachinery, and execute a control action based on deriving a load efficiency by applying the current load path, the minimum load path, the constant efficiency load path, or a combination thereof and the life cycle control modality, where the control action is applied to control a turbomachine system and a bottoming cycle system fluidly coupled to the turbomachine system.

In a third embodiment, a method includes providing, via a controller, a current load path, providing, via the controller, a minimum load path, providing, via the controller, a constant efficiency load path, and providing, via the controller, constraints. The method includes receiving, via the controller, a user input representative of a life cycle control modality for a turbomachinery. The method also includes executing, via the controller, non-linear analysis, utilizing, via the controller, sensor data and deriving load path curves, and executing, via the controller, a control action using one of the derived load path curves based on deriving a load efficiency by applying the current load path, the minimum load path, the constant efficiency load path, or a combination thereof, the life cycle control modality, and the constraints, where the control action is applied to control a turbomachine system and a bottoming cycle system fluidly coupled to the turbomachine system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. The term "firing temperature" may refer to the overall temperature of the combustion gases generated in the combustion system of a turbomachinery system or to the temperature of the combustion gases at specific locations in the turbomachinery system, such as a temperature at a trailing edge of a fuel nozzle. The firing temperature can refer to different reference stations within the combustion or turbine system such as combustor exit, turbine inlet or stage 1 nozzle trailing edge. A "firing control algorithm" may refer to an algorithm that determines a desired firing temperature and then manipulates one or more actuators, such as fuel valves delivering fuel to fuel nozzles, to produce an actual firing temperature in a combustion system.

Present embodiments relate to systems and methods for enhancing or improving the life of turbomachinery systems including bottoming cycle systems by utilizing a model based control system to derive a constant efficiency load path. The constant efficiency load path embodies the lowest firing temperature (Tfire) set point throughout a load path with minimal or no impact on combined cycle gas turbine (CCGT) efficiency (e.g. providing same output as current load path) while abiding by certain system constraints. Once derived, the constant efficiency load path may be utilized as a baseline to derive other load path curves that embody a selected life cycle control modality. Each load path curve may provide a specific firing temperature (Tfire) reduction set point to apply throughout the load path. Additionally, each load path curve may provide certain tradeoffs (e.g., longer part life vs. lower efficiency, etc.) that a user can advantageously leverage.

In certain embodiments, the Tfire reduction set point to apply as a reference point for a selected life cycle control modality executable by a controller may be derived dynamically by a Tfire reduction model, which will be described in more detail below. The Tfire reduction model may generate models associated with the turbomachinery system and bottoming cycle system and utilize, for example, non-linear analysis to find the Tfire reduction set point. It should be noted that turbomachinery system may be referred to as a gas turbine system and bottoming cycle system may be referred to as a heat recovery steam generator (HRSG) and/or steam turbine downstream of the HRSG. However, any suitable bottoming cycle may be utilized in addition to an HRSG, and/or the steam turbine, such as a cooling tower, other steam turbines, and the like. Specifically, the life cycle control modalities taken into consideration by the Tfire reduction model may include various modes selectable by a user, such as improved efficiency of the CCGT, improved hot gas path (HGP) life, minimal or no CCGT plant efficiency change, impact X % of CCGT efficiency ("X" being any number 0-100), improved profit (e.g., life and performance tradeoff), lower attemperation flow, and so forth.

Further, the model based control system may generate and take into consideration several constraints, such as carbon oxide (CO), lean blow-out (LBO), HRSG exhaust temperature, HRSG drum pressure limit, and nitrous oxide (NOx) boundaries. Based on the life cycle control modality input and the constraints, the model based control system may generate load path curves mentioned above that are based off of the constant efficiency load path. Benefits of the described techniques may include, among others, allowing a user to select a life cycle control modality to apply to a turbomachine system and included bottoming cycle that will dynamically derive the corresponding Tfire reduction set point to utilize for a load path to achieve desired goals (e.g., constant efficiency and/or longer part life, etc.).

Figure 1:
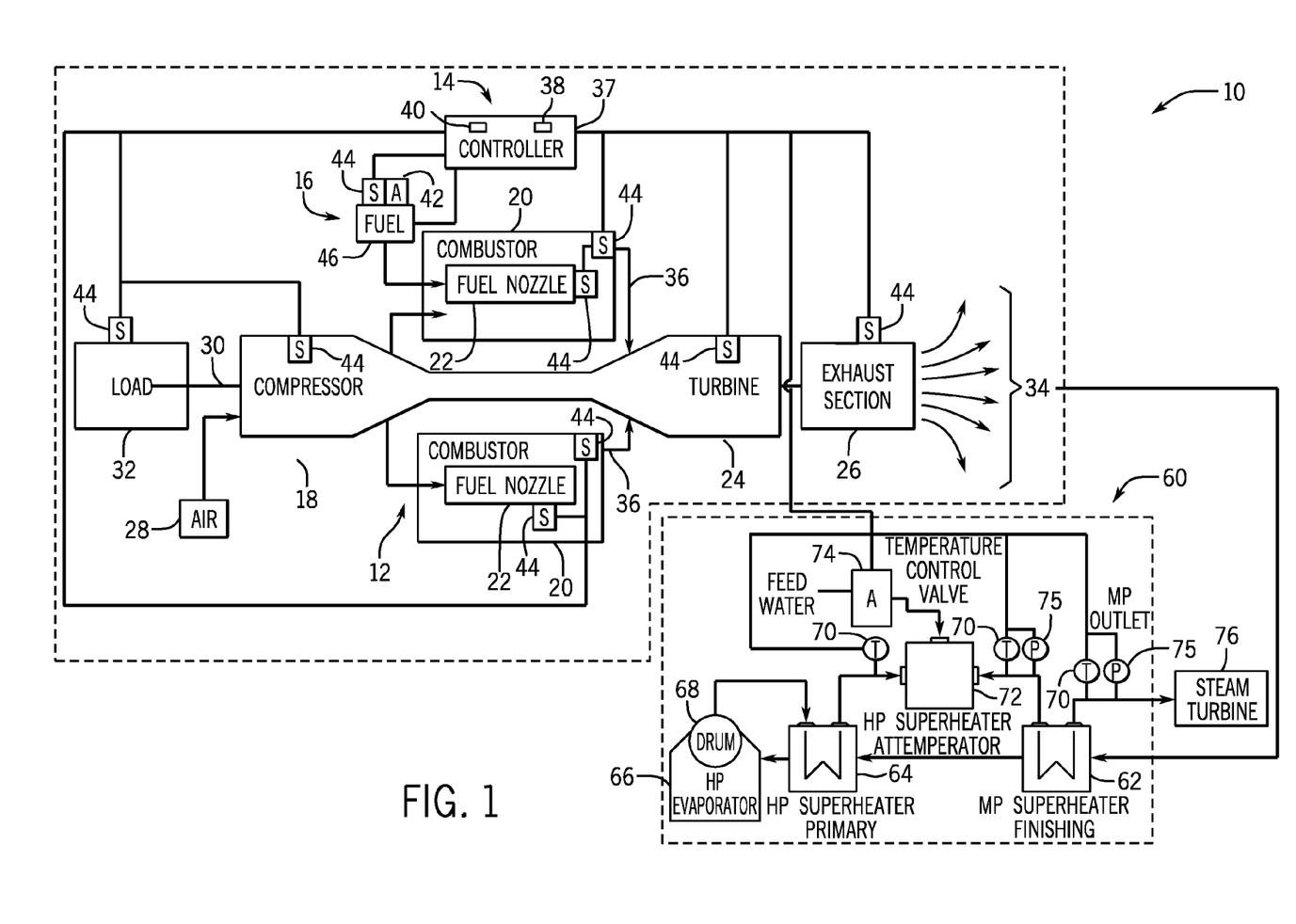
FIG. 1 a block diagram of an embodiment of a gas turbine system with a bottoming cycle (e.g., including a heat recovery steam generator [HRSG]), in accordance with an embodiment of the present approach.

With the foregoing in mind, it may be useful to describe an embodiment of a turbomachinery system, such as an example gas turbine system 10 illustrated in FIG. 1. In certain embodiments, the gas turbine system 10 may include a gas turbine 12, a model based control system 14, and a fuel supply system 16. These systems may operate in conjunction to determine Tfire in the gas turbine 12 and to adjust the fuel supply system 16. As illustrated, the gas turbine 12 may include a compressor 18, combustion system 20, fuel nozzle 22, turbine 24, and exhaust section 26. During operation, the gas turbine 12 may intake gas (e.g., air) 28 into the compressor 18, which then compresses the air 28 and moves it to the combustion system 20 (e.g., a plurality of combustors). In the combustion system 20, the fuel nozzle 22 (or a plurality of fuel nozzles 22) injects fuel that mixes with the compressed air creating an air-fuel mixture. The air-fuel mixture may combust in the combustion system 20 to generate hot combustion gases, which flow downstream into the turbine 24 to drive one or more turbine 24 stages. For example, the combustion gases move through the turbine 24 to drive one or more stages of turbine 24 blades, which in turn drive rotation of shaft 30. The shaft 30 connects to a load 32, such as a generator that uses the torque of the shaft 30 to produce electricity. After passing through the turbine 24, the hot combustion gases may vent as exhaust gases 34 into a bottoming cycle system (e.g., HRSG) 60, through the exhaust section 26.

In certain embodiments, the model based control system 14 may include a controller 37, a processor 38, a memory 40, and a hardware interface (not shown) suitable for interfacing with the actuators 42 and the sensors 44. Accordingly, the model based control system 14 may be communicatively coupled to sensors 44 such that the controller 37 may receive data from the sensors 44. In response to the sensor 44 data, the processor 38 may then execute instructions stored on the memory 40 to control components of the gas turbine system 10 (e.g., fuel system 16) via the actuators 42. The actuators 42 may include valves, pumps, positioners, inlet guide vanes, switches, and so on, useful in performing control actions. The sensors 44 may provide various data to the controller 37 including, for example, the amount of fuel 46 provided to the combustion system 22, the temperature of the fuel 46, the pressure ratio of the compressor 18, and the inlet temperature of the compressor 18.

Tfire of the combustion system 20, as described above, may be controllable by the model based control system 14 to achieve certain goals of a user by applying selectable life cycle control modalities. As such, the memory 40 may contain non-transitory computer instructions stored on a tangible, computer-readable medium that generate models to use in a Tfire reduction model. The Tfire reduction model may generate different load paths, one of which may include the constant efficiency load path that defines the desired lowest Tfire reduction set point to apply throughout the course of a load with minimal or no impact on CCGT efficiency while reducing wear and tear on the parts/systems. As previously mentioned, the load path that is generated may depend on the life cycle control modality chosen by the user and the constraints (e.g., CO, LBO, NOx, HRSG exhaust temperature, HRSG drum pressure limit, etc.) that are generated. Example life cycle control modalities include improved efficiency of the CCGT, improved HGP life, minimal or no CCGT efficiency change, impact X % of CCGT efficiency ("X" being any number 0-100), improved profit, lower attemperation flow point, and so forth. The applied generated load path will control the Tfire set point, which in turn controls the temperature of the exhaust gas that is fed into HRSG 60.

The HRSG 60 may include HP superheaters 62 and 64, HP evaporator 66, steam drum 68, and HP superheater attemperator 72, which may be utilized in generating steam to provide to a steam turbine 76, load, or other downstream system. For example, exhaust gases 34 enter the HRSG 60 and initially flow through HP superheaters 62 and 64 and are passed to HP evaporator 66. HP evaporator 66 converts the water in the superheated exhaust gases 34 into vapor (e.g., steam) which is stored in steam drum 68. From the steam drum 68, steam may be fed back into HP superheater 64 where it is superheated. The steam's temperature may be monitored by a temperature sensor 70 and may be provided to the model based control system 14.

The model based control system's 14 memory 40 may contain information relating to the desired steam temperature set point. The Tfire reduction model may use the provided steam temperature in calculating the constant efficiency load path. If the provided steam temperature is above the desired set point, the controller 37 may send actuation signals, for example, to a temperature control valve 74 to feed water into the HP superheater attemperator 72 to lower the temperature of the steam. If the temperature of the steam has not met or exceeded the steam temperature set point, the controller 37 may reduce or stop the spray of water in the HP superheater attemperator 72. It should be noted that spraying water into the HP superheater attemperator 72, for example, to maintain steam temperature within the HRSG design limitation, may result in lower life of HRSG pressure parts and steam piping than may be desired. It may also result in lower combined cycle efficiency than desired. Thus, by utilizing the techniques described herein, such as by selecting the "lower attemperation flow" life cycle control modality, steam temperature may be managed by applying a reduced Tfire set point that may reduce actual Tfire so that CO and LBO boundaries are met. In this way, water may not be used to manage the temperature of the steam at all. As a result, the reduced Tfire applied may reduce wear and tear on the HRSG.

The steam's temperature will be measured by another temperature sensor 70 before being sent to HP superheater 62 and temperature sensor measurements may be provided to the model based control system 14. Further, the steam pressure may be measured by pressure sensor 75 before being fed into HP superheater 62 and pressure sensor measurements may be provided to the model based control system 14. The model based control system 14 may utilize the steam pressure (e.g., high pressure, intermediate pressure, etc.) in determining the constant efficiency load path. In one embodiment, the HP superheater 62 may re-superheat the steam if the temperature has not met the steam temperature set point. Alternatively, if the steam's temperature has met the steam temperature set point, HP superheater 62 may heat the steam to maintain the temperature at the set point before releasing the steam to a steam turbine 76. However, before feeding the superheated steam to the steam turbine 76, the steam's temperature and pressure may be measured by temperature sensor 70 and pressure sensor 75, respectively, and the measurements may be provided to the model based control system 14 for use by the modeling techniques described herein.

Figure 2:
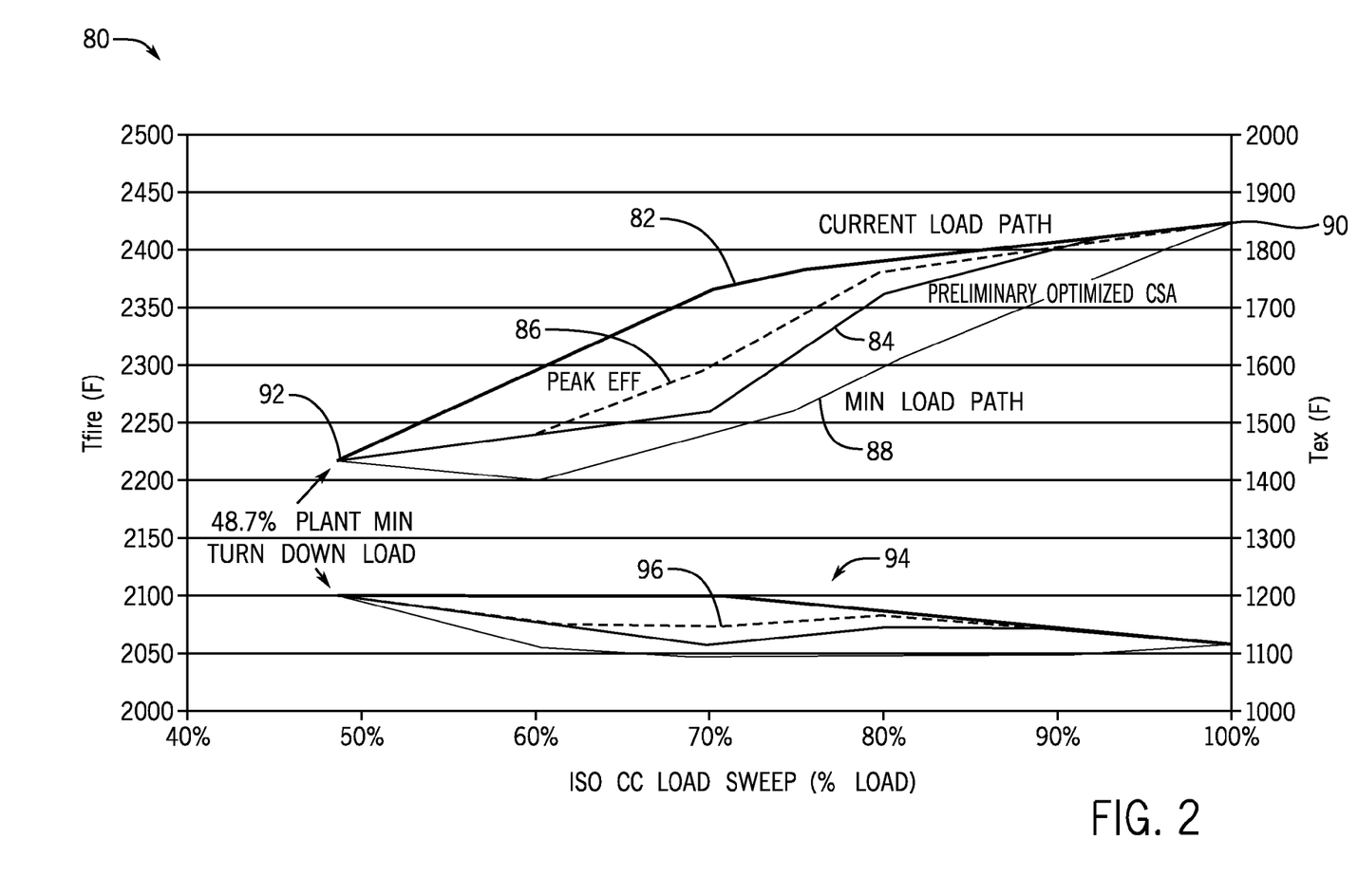
FIG. 2 is a graph depicting embodiments of dynamically generated load path curves for firing temperature (Tfire) set points and exhaust gas temperature set points using the modeling techniques described herein.

FIG. 2 is a graph 80 depicting embodiments of dynamically generated load path curves for Tfire set points and exhaust gas temperature set points using the modeling techniques described herein. The dynamically generated load path curves involving Tfire set points may represent a current load path function 82, a constant efficiency load path function 84, and a minimum load path function 88. The graph 80 also depicts a peak efficiency load path function 86. The current load path function 82 and the minimum load path function 88 may create an operating window, where the two curves come together at the top-right at base load (e.g., maximum output) 90 and at the bottom left (e.g., minimum output) 92. Accordingly, the model generates the improved Tfire reduction set point for a load path within this operating window based upon which life cycle control modality a user has selected. As mentioned above, there are tradeoffs associated with each load path curve, and it may be beneficial to describe these tradeoffs as well as how the load path curves are generated.

To dynamically generate the load path curves, the model based control system 14 may utilize a Tfire reduction model. The Tfire reduction model may generate models of the gas turbine system 10 and HRSG 60. The models may be derived by modeling mechanical components (e.g., compressor blades, intake design, outlet design, etc.) through physics-based modeling techniques, such as low cycle fatigue (LCF) life prediction modeling, computational fluid dynamics (CFD), finite element analysis (FEA), solid modeling (e.g., parametric and non-parametric modeling), and/or 2-dimension to 3-dimension FEA mapping. Indeed, any number and variety of modeling techniques may be used, which may result in numerical and/or physical modeling of the gas turbine system 10 and HRSG 60.

As previously mentioned, the constant efficiency load path curve represents the lowest Tfire set point or a low Tfire set point such that lean blow out is prevented while efficiency is maintained (e.g., same output as current load path) within the generated constraints. Such an enhanced load path curve may provide several benefits such as less wear and tear in the HRSG while at the same time providing constant efficiency in the CCGT. To arrive at the constant efficiency load path curve, the Tfire reduction model may utilize non-linear constraint optimization analysis by fitting hundreds of data points along a load path with a variety of Tfires and exhaust temperatures to find the improved (e.g., minimum) Tfire set point that maintains CCGT efficiency (e.g., same output) and satisfies system constraints (e.g., CO, LBO, NOx, HRSG exhaust temperature, HRSG drum pressure limit, etc.) and combustion dynamics. The HRSG exhaust temperature constraint may be considered to avoid cold end erosion, and the HRSG drum pressure limit constraint in the low-pressure (LP) section may be considered because as airflow is increased, the flow and pressure profile may change in various pressure sections of the HRSG (high-pressure (HP), intermediate-pressure (IP), LP, etc.). For example, one section's flow and pressure may be reduced while another section's flow and pressure may increase.

Further, the model may take multiple factors into consideration when calculating the Tfire reduction set point to apply in the constant efficiency load path curve, such as HP and IP steam temperature, HP/IP steam temperature set points, high-pressure superheater (HPSH) and reheat (RH) attemperation flows (or valve position feedback), inlet guide vane (IGV) angle position, gas turbine exhaust temperature, and so forth. The values for some of these factors, such as steam temperature, gas turbine exhaust temperature, and so forth, may be provided via sensors (44, 70, and 75) to the model based control system 14. Other factors, such as the HP/IP steam temperature set points, may be stored on the model based system's 14 memory 40. It should be noted that the factors may change based upon which life cycle control modality the user has selected.

In an embodiment, the default life cycle control modality may be configured to the "no CCGT efficiency change" option. That is, the default Tfire reduction set point may be based upon the lowest Tfire with minimal or no impact on the combined cycle efficiency (e.g., the constant efficiency load path). However, a user may configure the default Tfire reduction set point according to any life cycle control modality listed above.

In addition, the constraints mentioned above (e.g., CO, LBO, NOx, HRSG exhaust temperature, HRSG drum pressure limit, etc.) may be generated by the Tfire reduction model and a Tfire enhancer may abide by those constraints when determining the constant efficiency load path curve. Indeed, the constraints generated may define or create the operating window previously described. Further, the model based control system may include an auto-tune function that maintains combustion dynamics within acceptable limits by changing the fuel splits to meet the above constraints. The model based control system 14 accomplishes this by having the controller 37 issue a control action to the fuel supply system 16 (e.g., by communicating actuation signals suitable for modulating one or more fuel valves).

Once the constant efficiency load path curve is derived, the Tfire reduction model may generate a tailored Tfire reduction set point for a load path dynamically for a chosen life cycle control modality based off of the constant efficiency load path and the constraints. The load path curve may be generated similarly as the constant efficiency load path curve by the Tfire reduction model and, for example, non-linear analysis. In certain embodiments, the current load path function, the minimum load path function, the constant efficiency load path function, or any combination thereof, and the life cycle control modality chosen may be applied to derive the load path. It should be noted that the shape of any curve may be changed (and/or the curve shifted) based on certain system and environmental factors, such as degradation of parts, ambient conditions, hardware changes, fuel sources (e.g., land based gas vs. off-shore wells), and so forth. The generated load path may trigger the controller 37 to issue a control action, such as instructing the fuel system 16 to set the Tfire at a certain temperature.

To illustrate, if the user chooses the "lower attemperation flow" life cycle control modality, the model based control system 14 may utilize the Tfire reduction model to minimize attemperation flow by reducing Tfire until CO and LBO boundaries are encountered. This life cycle control modality is shown as the minimum load path 88 in FIG. 2. However, although the minimum load path 88 may represent the lowest Tfire available while still meeting the boundaries, the minimum load path 88 may be less efficient for the CCGT. Additionally, if the user desires the "improved CCGT efficiency" life cycle control modality, the model will analyze ambient conditions, degradation, and so forth, and provide the Tfire reduction set point reflected by the peak efficiency load path curve 86. However, running at peak efficiency may lower part life as it may result in a higher Tfire than the constant efficiency load path curve 84. To further illustrate, if the user chooses the "impact X % of CCGT efficiency" life cycle control modality, the model may dynamically reduce Tfire to the set point that will achieve X % efficiency loss. However, this efficiency loss may generate longer part life because a "colder" Tfire is utilized. Thus, using the constant efficiency load path, the Tfire reduction model enables a user to analyze various tradeoffs (e.g., efficiency vs. part/system life, etc.) and select a life cycle control modality that satisfies their goals.

The turn down load path curves 94 on the bottom portion of the graph 80 represent the exhaust temperature set points that result from the respective Tfire set points in the generated Tfire load path curves. For example, the peak efficiency load path curve 86 would generate exhaust temperatures shown by the dashed curve 96. In an embodiment, the Tfire reduction model may utilize exhaust temperature as a factor when determining the Tfire reduction set point for a load path.

Figure 3:
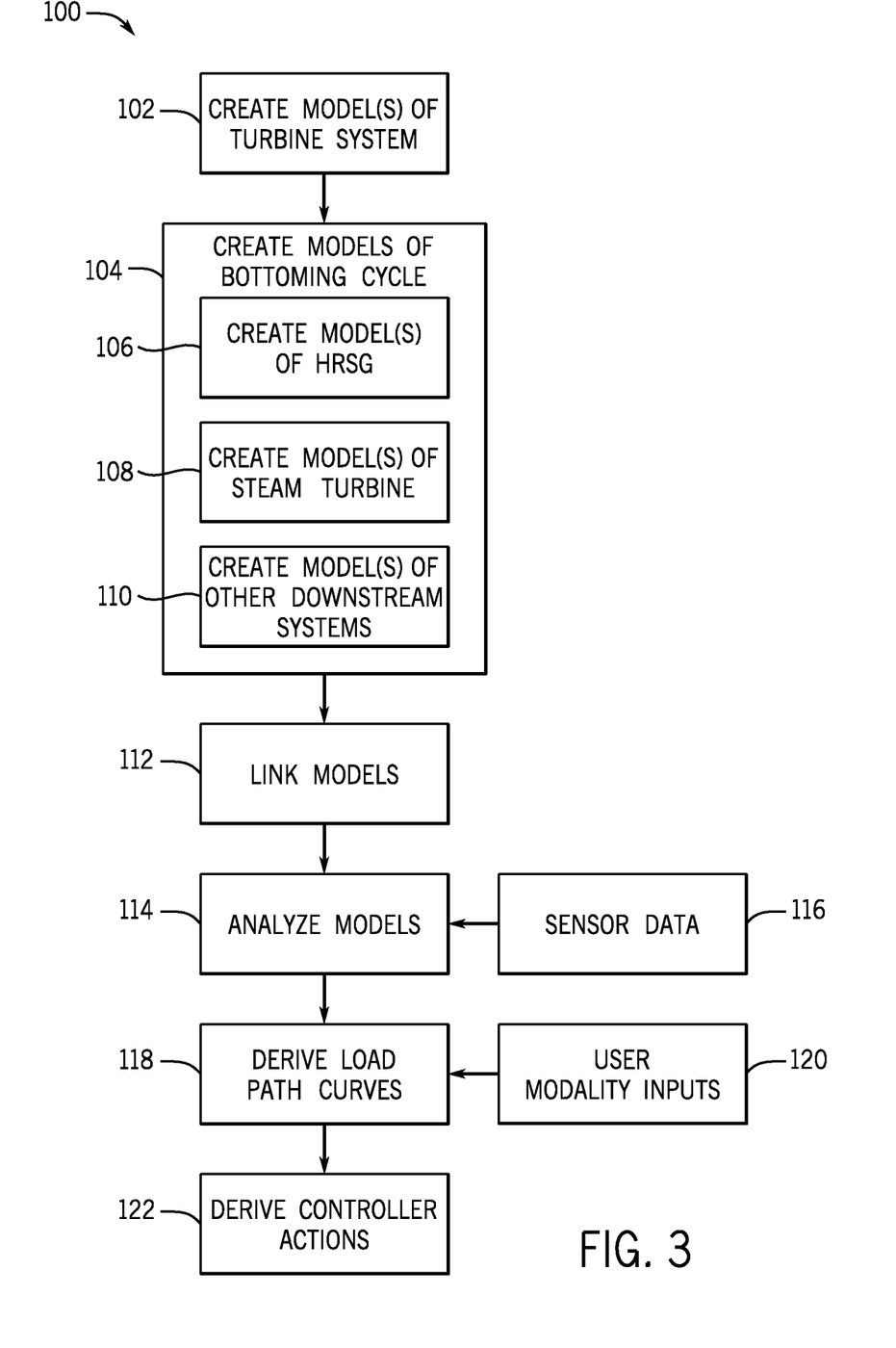
FIG. 3 is a flow diagram of a process useful for utilizing models to generate load path curves, in accordance with an embodiment of the present approach.

FIG. 3 is a flow diagram of an embodiment of a process 100 suitable for executing models to generate load path curves, in accordance with an embodiment of the present approach. The process 100 may be implemented as computer code or instructions executable by the processor 38 and stored in the memory 40 (computer-readable medium). The model based control system 14 may initially create model(s) of the gas turbine system, as shown in block 102. As mentioned, the model(s) may be generated using physics-based modeling techniques, artificial intelligence (AI) techniques, data mining techniques, or a combination thereof. Next, models of the bottoming cycle system are created in block 104. Creation of these models may include creating model(s) of the HRSG (block 106), creating model(s) of steam turbine (block 108), and/or creating model(s) of other downstream systems (block 110). As with the gas turbine system models, the bottoming cycle models may also be generated using physics-based modeling techniques, AI techniques, data mining techniques, or a combination thereof. In block 112, the model based control system 14 links the models by tying correlating inputs and outputs together. For example, the gas exhaust from the gas turbine system would be an output of the gas turbine system model that would be linked as an input to the bottoming cycle model(s).

The model based control system 14 will analyze the models (block 114) by inserting sensor data (block 116) into the Tfire reduction model. In certain embodiments, non-linear analysis, which is described in more detail with reference to FIG. 4 below, is utilized to analyze the models. Next, load path curves, such as the constant efficiency load path curve, current load path curve, minimum load path curve, peak efficiency curve, and so forth will be derived (block 118) by the modeling techniques described above utilizing the sensor data. In addition, the life cycle control modality selection may be input in block 120 in order to derive the desired Tfire reduction set point. After the load path curves are derived in block 118, the controller 37 actions are derived (block 122). For example, if the constant efficiency load path curve is applied to the gas turbine system 10 and HRSG 60, the controller 37 actions may include providing a Tfire reduction set point to apply throughout the load path and providing a steam temperature set point. By providing for a process 100, the techniques described herein may derive models and load paths useful in enhancing the lives of turbomachinery with bottoming cycles and their associated parts by controlling the Tfire reduction set point for a selected life cycle control modality.

Figure 4:
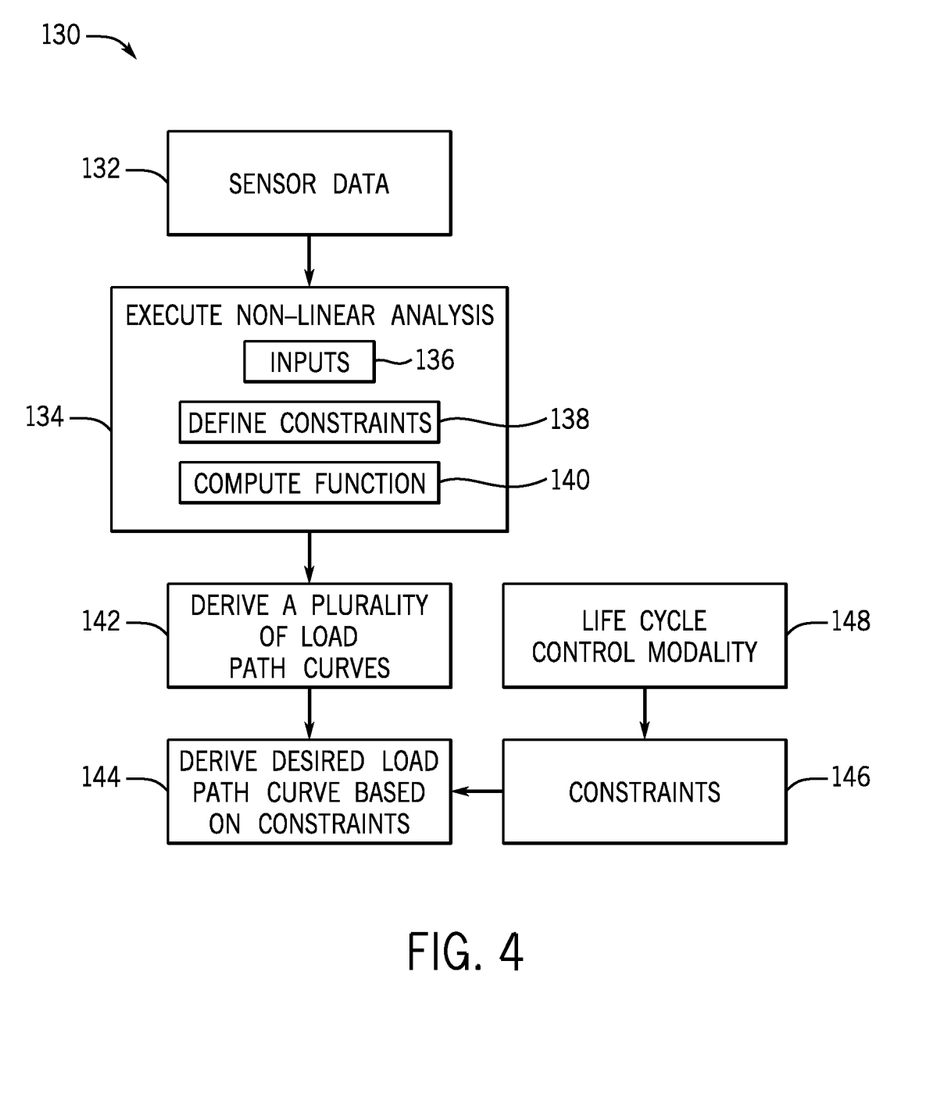
FIG. 4 is a flow diagram of a process suitable for performing non-linear analysis with sensor data to generate a plurality of load path curves, in accordance with an embodiment of the present approach.

FIG. 4 is a flow diagram of an embodiment of a process 130 suitable for performing, for example, non-linear analysis with sensor data to generate a plurality of load path curves, in accordance with an embodiment of the present approach. The process 130 may be implemented as computer code or instructions executable by the processor 38 and stored in the memory 40. In block 132, sensor data is obtained by the model based control system 14. Sensor data may be provided by sensors 44 in the gas turbine system 10 and/or temperature sensors 70 and pressure sensors 75 in the bottoming cycle system (e.g., HRSG) 60. Using the sensor data, the model based control system 14 executes non-linear optimization analysis in block 134. As described above, non-linear analysis may enable finding the improved Tfire reduction set point by plotting a plurality of data points (e.g., a hundred data points or more) for Tfires along a load path within the generated constraints. Non-linear analysis is the process of solving an optimization problem, such as deriving an improved Tfire reference point along a load path, defined by constraints over a set of unknown real variables, along with an objective function to be maximized or minimized, where some of the constraints or the objective function may be nonlinear. In block 136, the objective function utilized may accept certain inputs, such as sensor data (e.g., steam temperature and/or pressure, exhaust temperature, etc.), systematically choose other inputs, and solve for an improved Tfire to apply throughout a load path based on the life cycle control modality selected and defined constraints (blocks 138 and 140).

The typical formulation of a nonlinear constrained optimization (or nonlinear programming) problem is: "Find the minimum (or maximum) of a scalar cost function $f(x)$ over the decision variable set $x \epsilon X$ subject to nonlinear equality constraints $h_i(x)=0$, $i=1, 2, \ldots, n$ and nonlinear inequality constraints $g_j(x) \leq 0$, $j=1, 2, \ldots, m$."

In the combined cycle (CC) constant efficiency load path problem, the decision variables x may include the gas turbine Inlet Guide Vane position, the gas turbine fuel flow and the combustor fuel splits (or valves positions); vector x lies in a polytope X defined by the minimum and maximum values of these decision variables that are imposed by hardware limitations.

The scalar cost function may be defined as $f(x)=T_{fire}$, which is a nonlinear function of x as well as the gas turbine combustion operation boundaries (e.g., CO, $NO_x$, and nozzle pressure ratio PK limits) and the CC plant efficiency. The nonlinear inequality constraints are written, without loss of generality, in the generic form $g_j(x) \leq 0$, and may be used to represent combustion operation boundaries such as $CO \leq CO^{max}$, $NO_x \leq NO_x^{max}$ and $PK \leq PK^{max}$. Note that CO, $NO_x$, PK are nonlinear functions of ambient and gas turbine operating conditions.

Finally, the nonlinear equality constraint $h_1(x)=0$ may be used to represent a constant CC efficiency $\eta_{CC}=\eta_{CC}^{nom}$ (if the CC plant efficiency is allowed to change by $\eta_{CC}^{nom} \epsilon$, $\epsilon > 0$, then this can be captured by $g_m(x) \leq 0$). Note that $\eta_{CC}$ is a nonlinear function of ambient and plant operating conditions.

If the decision variables space X is of low dimension (typically the number of decision variables is less than or equal to 3), then grid search over X may be suitable to find an admissible value of $x=x^+$ that minimizes $f(x)=T_{fire}$. If on the other hand the dimension of X is large (typically when the number of decision variables is larger than 4), then more computationally efficient optimization algorithms such as interior-point algorithms, active-set algorithms or Sequential-Quadratic-Programming (SQP) algorithms must be used.

The non-linear analysis results may then be used as input to derive a plurality of load path curves in block 142. Examples of derived load path curves may include the constant efficiency load path curve 84, a minimum load path curve 88 while meeting certain constraints (e.g., CO emissions, LBO, NOx emissions, HRSG exhaust temperature, HRSG drum pressure limit, etc.), a peak efficiency load path curve 86, and a current load path curve 82, among others. The model based control system 14 may then derive the desired load path curve from the plurality of load path curves based on constraints generated for the selected life cycle control modality (blocks 144, 146, and 148). The constraints utilized in the non-linear analysis may be conditions of the Tfire optimization problem that the solution must satisfy. The constraints may be equality, inequality, integer constraints, and the like. Further, the constraints may change depending on the life cycle control modality selected (block 148). For example, if the user selects the "lower attemperation flow" life cycle control modality, the Tfire reduction model may reduce Tfire until LBO and CO boundaries are met, and thus, an equality constraint for the non-linear analysis may define that the feasible set of candidate Tfire set points be equal to the LBO and CO boundaries. In addition, if the user selects to improve efficiency as the life cycle control modality, a constraint may define that the feasible set of candidate Tfire set points generates the highest amount of efficiency possible along a given load path.

Technical effects of the described embodiments include improving the life of gas turbines with bottoming cycles and their associated parts by deriving a Tfire reduction set point to apply throughout a load based on a selected life cycle control modality. Certain embodiments may utilize a Tfire reduction model that performs modeling and/or non-linear analysis to find an improved Tfire while taking into consideration various constraints (e.g., CO emissions, LBO, NOx emissions, HRSG exhaust temperature, HRSG drum pressure limit, etc.) and the selected life cycle control modality. For example, using the techniques described herein, a constant efficiency load path may be derived that reduces Tfire as low as possible while still maintaining constant efficiency. As previously mentioned, each load path derived may include tradeoffs, such as longer part life at the cost of a lower efficiency. An operator aware of the tradeoffs may be enabled to leverage the techniques disclosed herein advantageously to run the turbomachinery with the bottoming cycle at the Tfire that achieves desired goals.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system comprising:
  a controller comprising:
    a memory storing:
      a current load path;
      a minimum load path;
      a constant efficiency load path; and a processor configured to execute a control process, wherein
the control process is configured to receive a user input representative of a life cycle control modality and to execute a control action based on deriving a load efficiency by applying the current load path, the minimum load path, the constant efficiency load path, or a combination thereof, and the life cycle control modality, wherein the control action is applied to control a turbomachine system and a bottoming cycle system fluidly coupled to the turbomachine system.

2. The system of claim 1, wherein the bottoming cycle system comprises a heat recovery steam generation (HRSG) system, a steam turbine system, a cooling tower system, or a combination thereof.

3. The system of claim 2, wherein the HRSG system comprises an attemperation system having a spraying system fluidly coupled to a boiler of the HRSG system, and the control action controls the spraying system.

4. The system of claim 1, wherein the constant efficiency load path comprises a lowest Tfire set point with minimal or no impact on combined cycle gas turbine efficiency.

5. The system of claim 1, wherein the life cycle control modality comprises running a gas turbine at lowest firing temperature with minimal or no impact on combined cycle gas turbine (CCGT) efficiency, with improved CCGT efficiency, with improved hot gas path life, with improved profit, with a desired percentage impact on CCGT efficiency, with lower attemperation flow, or a combination thereof.

6. The system of claim 1, wherein the minimum load path comprises running the turbomachine system at lowest firing temperature while respecting carbon oxide and lean blow-out boundaries.

7. The system of claim 1, wherein the control process comprises modeling the turbomachine system and the bottoming cycle system with a firing temperature (Tfire) reduction model using a plurality of factors based on the life cycle modality input.

8. The system of claim 7, wherein the models are generated with physics-based modeling techniques comprising low cycle fatigue (LCF) life prediction modeling, computational fluid dynamics (CFD), finite element analysis (FEA), solid modeling, 2-dimension to 3-dimension FEA mapping, or any combination thereof.

9. The system of claim 7, wherein the plurality of factors comprise steam temperature, steam temperature set points, attemperation flow, inlet guide vane angle position, gas turbine exhaust temperature, or any combination thereof.

10. The system of claim 1, wherein the control process is configured to generate operating boundaries comprising carbon oxide, nitrous oxide, lean blow out, heat recovery steam generation (HRSG) exhaust temperature, and HRSG drum pressure limit.

11. The system of claim 1, wherein the constant efficiency load path is generated via non-linear optimization constraint analysis.

12. A computer-readable medium storing non-transitory computer instructions, the instructions configured to:
provide a current load path;
provide a minimum load path;
provide a constant efficiency load path;
receive a user input representative of a life cycle control modality for a turbomachinery; and
execute a control action based on deriving a load efficiency by applying the current load path, the minimum load path, the constant efficiency load path, or a combination thereof, and the life cycle control modality, wherein the control action is applied to control a turbomachine system and a bottoming cycle system fluidly coupled to the turbomachine system.

13. The computer-readable medium storing non-transitory computer instructions of claim 12, wherein the constant efficiency load path represents a lowest firing temperature of the turbomachine with minimal or no impact on combined cycle gas turbine efficiency.

14. The computer-readable medium storing non-transitory computer instructions of claim 12, wherein the life cycle control modality comprises operating a gas turbine at a lowest firing temperature with minimal or no impact on combined cycle gas turbine (CCGT) efficiency, with improved CCGT efficiency, with improved hot gas path life, with improved profit, with a desired percentage impact on CCGT efficiency, with lower attemperation flow, or a combination thereof.

15. The computer-readable medium storing non-transitory computer instructions of claim 12, wherein the load efficiency is derived by modeling the turbomachine system and the bottoming cycle system with a firing temperature (Tfire) reduction model using a plurality of factors depending on the life cycle modality input.

16. The computer-readable medium storing non-transitory computer instructions of claim 15, wherein the plurality of factors comprise steam temperature, steam temperature set points, attemperation flow, inlet guide vane angle position, gas turbine exhaust temperature, or any combination thereof.

17. The computer-readable medium storing non-transitory computer instructions of claim 12, wherein deriving the load efficiency comprises generating a firing temperature reduction set point to apply throughout a load path.

18. A method comprising:
providing, via a controller, a current load path;
providing, via the controller, a minimum load path;
providing, via the controller, a constant efficiency load path;
providing, via the controller, constraints;
receiving, via the controller, a user input representative of a life cycle control modality for a turbomachinery;
executing, via the controller, non-linear analysis;
utilizing, via the controller, sensor data and deriving load path curves; and
executing, via the controller, a control action using one of the derived load path curves based on deriving a load efficiency by applying the current load path, the minimum load path, the constant efficiency load path, or a combination thereof, the life cycle control modality, and the constraints, wherein the control action is applied to control a turbomachine system and a bottoming cycle system fluidly coupled to the turbomachine system.

19. The method of claim 18, wherein the constraints comprise carbon oxide, nitrous oxide, lean blow-out, heat recovery steam generation (HRSG) exhaust temperature, and HRSG drum pressure limit.

20. The method of claim 18, wherein the life cycle control modality comprises operating a gas turbine at the lowest firing temperature with minimal or no impact on combined cycle gas turbine (CCGT) efficiency, with improved CCGT efficiency, with improved hot gas path life, with improved profit, with a desired percentage impact on CCGT efficiency, with lower attemperation flow, or a combination thereof.

* * * * *